Jan. 28, 1969　　　J. B. GREENFIELD　　　3,424,442
COOLING TOWER WATER DISTRIBUTOR
Filed Sept. 6, 1966

INVENTOR
JOHN B. GREENFIELD

BY *Beaman & Beaman*

ATTORNEYS

United States Patent Office 3,424,442
Patented Jan. 28, 1969

3,424,442
COOLING TOWER WATER DISTRIBUTOR
John B. Greenfield, Jackson, Mich., assignor to Acme Industries, Inc., Jackson, Mich., a corporation of Delaware
Filed Sept. 6, 1966, Ser. No. 577,272
U.S. Cl. 261—81    11 Claims
Int. Cl. B05b 3/16

ABSTRACT OF THE DISCLOSURE

Heat exchanger apparatus of the gas-liquid contact type such as the type generally referred to as cooling towers utilizing a water reaction powered water distributor which oscillates about a horizontal axis above water and air contact members. The angular relationship of orifices emitting water defined on the distributor being changed by simplified apparatus at the terminal portions of the arcuate swing through which the distributor passes said apparatus including a flexible hose forming a torsion member.

---

Figure 1:
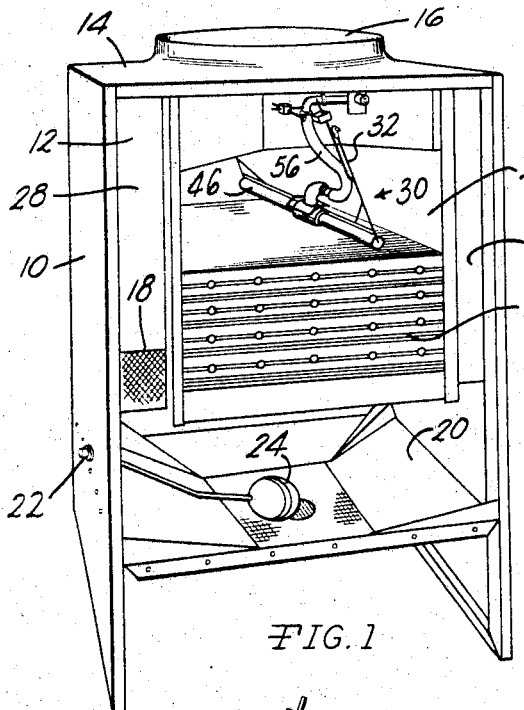

In devices of the aforementioned type, it is common to distribute water on the contact members, which may take the form of plates, slats, or the like. The water distribution on the contact members may take place through nozzles, drips pans or rotating distributors. Heat exchangers of the type often employed with air-conditioning equipment consist of a housing having an inlet and outlet defined therein which supports a plurality of vertical plates adapted to receive and distribute water which is placed on the upper regions of the plates and flows down the plates to a sump. Air is drawn into the housing inlet and exhausted through the outlet, and in the course of passage through the housing "scrubs" against the wet plates and produces a heat-exchanging relationship between the water and air.

A considerable amount of difficulty has been encountered in distributing the water on the contact plates of heat exchange structure of the described type. In crossflow devices, wherein the air flow is in a horizontal direction, the water is usually distributed on the plates by means of pans having a plurality of holes therein. This system of water distribution cannot be used in the more efficient counterflow type wherein the air flow is in an upward direction through the contact plates, as the pans restrict the air flow through the housing. It is desirable to use the more efficient counterflow apparatus, and the most common method for distributing water on the plates has been to use spray nozzles. Such spray nozzles have not been completely satisfactory as the water distribution on the plates is not uniform and the fine water particles produced often remain in the air flow and are drawn from the housing. Drift eliminators are often used in counterflow heat exchange apparatus to minimize the loss of water in this manner. However, such drift eliminators increase the resistance to air flow through the heat exchanger housing and add expense to its construction.

Rather than use nozzles, some counterflow heat exchange apparatus employes a rotating distributor arm which rotates about a vertical axis above the contact plates to distribute water on the plates. While this apparatus permits the water pressure leaving the distributor to be low enough to prevent water spray and "drift," the water distribution area is circular and, thus, the apparatus must be circular if it is to be employed efficiently with this type of apparatus. Circular towers are expensive and difficult to manufacture. If the heat-exchanging apparatus is of the usual rectangular form, the use of the rotating distributor arm means that a portion of the contact plates, those adjacent the corners of the housing, will not be wet. Also, the rotating distributor arm is subject to bearing problems, in that costly and complicated bearings are needed to support the distributor arm and resist the corrosion to which such bearings are subjected.

The invention pertains to an oscillating water distribution system for water-air heat exchange apparatus, wherein the water is efficiently distributed in a square or rectangular pattern. Thus, the oscillating water distribution apparatus of the invention can be readily employed with the conventional rectangular heat exchanger configuration and overcomes many of the problems existing with a rotating distribution arm.

Another object of the invention is to provide an oscillating water distribution arm wherein the water leaving the distribution arm is at a low velocity and, thereby, eliminates fine mist spray and eliminates the need for drift eliminators in a counterflow heat exchanger.

An additional object of the invention is to provide a water-contacting heat exchanger utilizing an oscillating water distribution device wherein the water distributor incorporates pivotally supported structure, yet the bearing structure for the supporting device is readily accessible and replaceable, and may be of a simple and economical construction.

Another object of the invention is to provide a water distribution system for a counterflow heat exchange apparatus, wherein the water velocities required are low and the pumping head necessary for proper operation is kept at a minimum, yet excellent water distribution is obtained and high heat-exchanging capacities per square foot of distribution are possible.

An additional object of the invention is to provide a water distribution apparatus for a heat exchanger wherein low manufacturing and material costs are experienced, and the apparatus is depenndable in operation and may be easily serviced and maintained.

Figure 2:
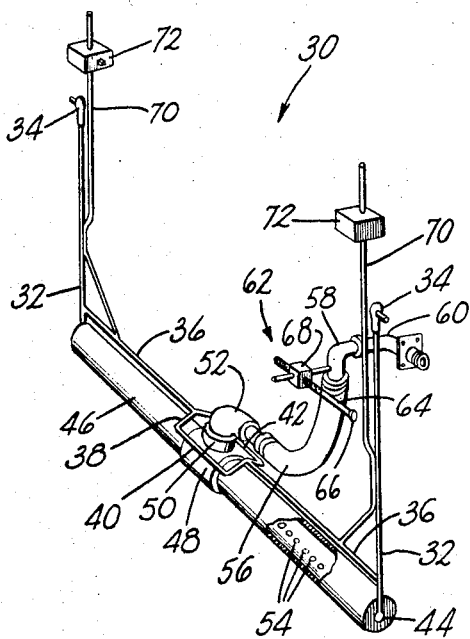
Figure 3:
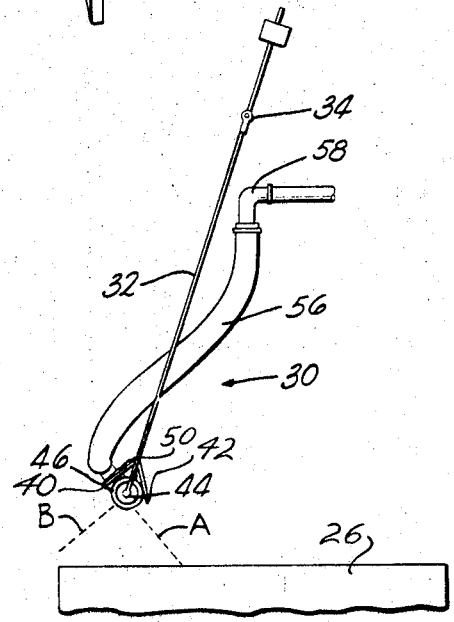
Figure 4:
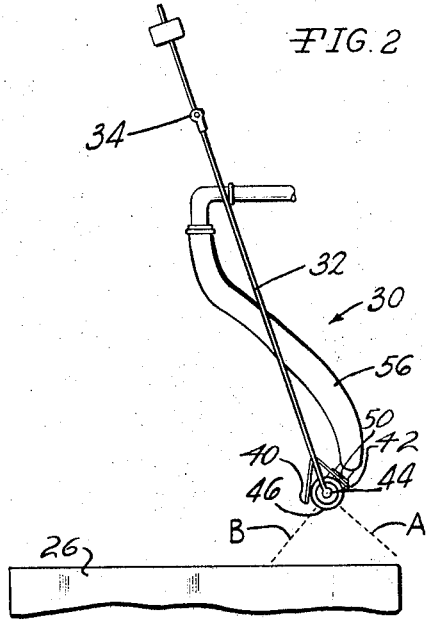

These and other objects of the invention arising from the details and relationships of the components of an embodiment thereof will be apparent from the following description and accompanying drawings wherein:

FIG. 1 is a perspective view of heat exchanger apparatus in accord with the invention, the front panel being removed for purposes of illustration, FIG. 2 is a perspective view of the water distribution apparatus, per se, shown in the lowermost or intermediate position, a portion of the head being cut away for purpose of illustration, FIG. 3 is an elevational, enlarged, detail end view of the water distributor of the apparatus at substantially the completion of oscillation to the left and immediately prior to pivoting of the distributor, and FIG. 4 is an elevational, enlarged, detail end view of the water distributor of the invention at substantially the completion of oscillation to the right and just prior to pivoting of the distributor to begin oscillation to the left.

FIG. 1 illustrates a typical counterflow heat exchanger of the cooling tower type such as often employed with air conditioning, refrigeration, and similar systems. The apparatus includes a substantially rectangular housing defined by side panels 10, a rear panel 12, and a front panel, not shown, enclosed at the upper region by a top panel 14 having an outlet opening 16 defined therein. An exhaust fan, not shown, is normally placed within the housing adjacent the outlet 16. A grille or similar opening 18 is formed in the lower region of the panel 12 and constitutes an air inlet whereby air may flow through the housing. In the lowermost regions of the housing, a water sump 20 is located which includes a drain, not shown, and an inlet valve 22 operated by a float 24 senses the amount of water within the sump and supplies water when needed.

A plurality of contact members, taking the form of plates 26, are disposed in spaced, parallel relationship within the housing. The contact plates 26 are associated with supporting baffles 28 such that all of the air entering the grille 18 must pass between the plates prior to being exahusted from the housing through the outlet opening 16. A water distributor 30 discharges water on the upper regions of the plates 26 and the water flows under gravitational forces along the plates, whereby air flowing upward through the plates flows counterdirectional to the water flow and the intermingling of the water and air, and the scrubbing of the air on the plates 26, produces an efficient heat exchange between the water and air.

As will be appreciated from FIG. 1, the upper edges of the plates 26 define a rectangular area over which the water must be distributed. In the practice of the invention, the water distributor 30 is in the form of an oscillating arm or conduit having a form which will be best appreciated from FIG. 2. The water distributor 30 includes a cradle consisting of arm elements 32 having pivot or bearing means 34 defined at the upper ends thereof. Pivot means, not shown, are mounted within the rear housing panel 12 and the front panel, to cooperate with pivot means 34 to pivotally support the cradle arm members 32 upon a horizontal axis. The lower regions of the cradle arm members 32 are interconnected by horizontal elements 36 which define a generally rectangular portion 38 in its central region. The portion 38 includes abutment bars 40 and 42 which are disposed at a greater distance from the axis of the bearings 34 than the elements 36.

The lower ends of the arm elements 32 are provided with bearings 44 whereby the water distributor manifold or head 46 may be pivotally mounted on the cradle directly below the elements 36 and the portion 38. The distributor head 46 is of an elongated, tubular conduit-type construction having a T member 48 disposed in its central region. The T 48 includes an upwardly extending portion 50 which receives an elbow 52. The outlet of the elbow 52 extends substantially parallel to the elements 36.

As will be apparent in FIG. 2, the underside of the distributor head 46 is provided with a plurality of holes or nozzle orifices 54. The holes 54 are disposed in an opposed diametrical relationship with respect to the T portion 50.

An elastomer conduit or hose 56 is affixed to the elbow at one end and communicates therewith. Preferably, the elastomer hose is formed of natural gum rubber for maximum life and the desirable torsional characteristics. The other end of the hose 56 is affixed to an elbow 58 which communicates with a fitting 60 fixed with respect to the heat exchanger housing, and a source of pressurized water commmunicates with the fitting 60.

An adjustment device 62 is associated with the water distributor. The adjustment device includes a threaded shaft 64 having a head 66 which is exteriorly accessible and bears on a member, not shown, fixed relative to the housing. The shaft 64 associates with a block 68 affixed to the elbow 58. The elbow 58 is so mounted that rotation of the shaft 64 pivots the elbow in a direction as to change the tension on the elastomer hose 56.

The cradle also includes a pair of extensions 70 which extend vertically above the bearings 34, and are located within the housing. Counterweights 72 are adjustably mounted on the upper regions of the extensions 70.

It has been found that an economical, yet long lasting bearing at 34 and 44 may be formed of polytetrafluoroethylene bushing members, commonly available under the trademark "Teflon."

It will be appreciated that the diameter of the T portion 50 is considerably less than the spacing between the cradle bars 40 and 42. Thus, the distributor head 46 is able to rotate approximately 90° relative to the cradle axis defined by bearings 44 before the T portion 50 engages one or the other of the cradle abutment bars.

In operation, pressurized water is supplied to the fitting 60 and, thus, into the distributor head 46 through the hose 56. The reaction of the water leaving the orifices 54 oscillates the cradle on the bearing 34 in the direction opposite to the direction in which the orifices are pointed. For instance, with reference to FIG. 3, if the nozzles are pointed such that the water is flowing in the line as indicated at A, the movement of the cradle will be to the left. On the cradle reaching the approximate position shown in FIG. 3, the torsional forces produced within the hose 56 will tend to "twist" or pivot the distributor head 46 on the axis defined by the bearings 44 in a clockwise direction and produce a relationship between the T portion 50 and the cradle 38, such as shown in FIG. 4, wherein the portion 50 engages the bar 42. This pivoting of the distributor head will now cause the orifices to be related such that the direction of fluid flowing therefrom will be as indicated at B, FIG. 3. Thereupon, the reaction forces imposed on the cradle will cause the cradle to pivot to the right to the maximum oscillation position as shown in FIG. 4. At the position of FIG. 4, the torsional forces produced within the hose 56 will again shift the head and T portion 50, this time in a counterclockwise direction, to again engage portion 50 with the bar 40 and direct the orifices 54 in a direction A, FIG. 4, which will cause the cradle oscillation to be to the left.

The above cycling continues as long as pressurized water is supplied to the distributor head. The distance of oscillations of the cradle can be regulated by the adjustment device 62. By turning the shaft 64 to pivot the elbow 58 in a direction which will tend to tighten the hose, the degree of cradle oscillation and duration will be reduced. Conversely, slackening the hose permits the assembly to swing further during each cycle and increases the duration of distribution. When the cradle is in the central, or neutral, position no torsional forces will be present in the hose.

It is appreciated that various modifications to the inventive concept may be apparent to those skilled in the art without departing from the spirit and scope thereof and it is intended that the invention be defined only by the following claims.

I claim:

1. A water contact heat exchanger comprising, in combination, a housing, a plurality of contact members supported within said housing adapted to receive and distribute water, an inlet and an outlet defined in said housing, said inlet and outlet being located so that air flowing into said housing through said inlet and leaving said housing through said outlet contacts said contact members, a water powered discharge reaction operated water distributor within said housing located above said contact members adapted to oscillate in an arc between terminal positions about a substantially horizontal axis, conduit means supplying water under pressure to said water distributor, orifice means defined on said distributor, the reaction force of water being ejected from said orifice means oscillating said water distributor relative to said axis to distribute water ejected from said orifice means upon said contact members over a rectangular area, and means changing the angular relationship of said orifice means to said horizontal axis adjacent the terminal positions of said water distributor.

2. In a water contact heat exchanger as in claim 1 wherein said water distributor includes a head pivotally mounted on said support means for oscillation about a second axis, said orifice means adapted to eject water in a direction transverse to said horizontal axis, said means changing the angular relationship of said orifice means being connected to said water distributor head for pivoting said distributor head relative to said second axis and thereby change the angular relationship of said orifice means to said horizontal axis and thereby vary the direction of the reaction force produced at said orifice means relative to said horizontal axis.

3. In a water contact heat exchanger as in claim 2 wherein abutment means are defined on said support means adapted to engage said water distributor head and limit the oscillation thereof relative to said second axis.

4. In a water contact heat exchanger as in claim 2 wherein said support means is in the form of a cradle, said water distributor head being located below said horizontal axis and counterweight means mounted on said support means above said horizontal axis.

5. In a water contact heat exchanger as in claim 2 wherein said means changing the angular relationship of said orifice means comprises a torsion member having a first portion attached to said distributor head and a second portion fixed relative to said housing.

6. In a water contact heat exchanger as in claim 5, adjustment means operatively associated with said torsion member adapted to vary the torsional characteristics thereof.

7. In a water contact heat exchanger as in claim 5 wherein said torsion member comprises an elongated, elastomer member.

8. In a water contact heat exchanger as in claim 7 wherein said elastomer member comprises a hose supplying pressurized water to said distributor head.

9. A water powered discharge reaction operated water distributor for use with water contact heat exchangers comprising, in combination, bearing means defining a substantially horizontal axis, a water distributor head suspended from said bearing means and adapted to oscillate in an arc between terminal positions about said substantially horizontal axis, conduit means supplying water under pressure to said water distributor head, orifice means defined in said distributor head, the reaction force of water being ejected from said orifice means oscillating said water distributor relative to said axis to distribute water ejected from said orifice means over a rectangular area, a torsion member having a first portion attached to said distributor head and a second portion fixed relative to said substantially horizontal axis, said torsion means changing the angular relationship of said orifice means to said horizontal axis adjacent the terminal positions of said water distributor head.

10. In a water powered discharge reaction operated water distributor as in claim 9 wherein said torsion member comprises an elongated, elastomer member.

11. In a water powered discharge reaction operated water distributor as in claim 9 wherein said elastomer member comprises a hose supplying pressurized water to said distributor head.

References Cited

UNITED STATES PATENTS

| 1,865,245 | 6/1932 | Goodloe | 55—230 XR |
| 3,263,977 | 8/1966 | Rickard | 261—112 |
| 3,266,553 | 8/1966 | Munters | 261—112 XR |

FOREIGN PATENTS

| 1,159,275 | 2/1958 | France. |

FRANK W. LUTTER, *Primary Examiner.*

TIM R. MILES, *Assistant Examiner.*

U.S. Cl. X.R.

239—229, 242, 255, 261; 261—112